(12) United States Patent
Cooper et al.

(10) Patent No.: US 7,519,615 B2
(45) Date of Patent: Apr. 14, 2009

(54) CHARACTERIZATION OF CONTENT BASED ON THE ASSOCIATED SERIALIZED DATA

(75) Inventors: Jonathan H. Cooper, Newport, RI (US); Jason C. Hallford, Provo, UT (US)

(73) Assignee: Intel Corporation, Santa Clara, CA (US)

( * ) Notice: Subject to any disclaimer, the term of this patent is extended or adjusted under 35 U.S.C. 154(b) by 406 days.

(21) Appl. No.: 10/215,375

(22) Filed: Aug. 7, 2002

(65) Prior Publication Data

US 2004/0030708 A1    Feb. 12, 2004

(51) Int. Cl.
*G06F 17/00* (2006.01)

(52) U.S. Cl. .................... 707/104.1; 707/101; 707/102; 707/103 R

(58) Field of Classification Search ............... 707/1–10, 707/100–104.1, 200–206
See application file for complete search history.

(56) References Cited

U.S. PATENT DOCUMENTS

| | | | |
|---|---|---|---|
| 6,671,323 B1* | 12/2003 | Tahara et al. ........... 375/240.26 |
| 2002/0052864 A1* | 5/2002 | Yamamoto ..................... 707/1 |
| 2002/0138733 A1* | 9/2002 | Ishibashi et al. ............ 713/176 |
| 2003/0028652 A1* | 2/2003 | Bardini et al. .............. 709/229 |
| 2004/0002896 A1* | 1/2004 | Alanen et al. ................. 705/14 |
| 2004/0003403 A1* | 1/2004 | Marsh ........................ 725/53 |

\* cited by examiner

*Primary Examiner*—Isaac M Woo
(74) *Attorney, Agent, or Firm*—Kacvinsky LLC

(57) ABSTRACT

Streaming broadcast information over a network is associated with metadata indicative of the broadcast information. The metadata describes the structure of the package as well as the content. The metadata may be bound to the content, and any of the number of clients may receive this metadata and filter it according to prestored criteria. Desired content can be obtained based on the thus filtered information.

6 Claims, 6 Drawing Sheets

STRUCTURAL REPRESENTATION OF A GAME PACKAGE

FIG. 3

| FIG. 3A |
| FIG. 3B |

```xml
<Packages>
  <Game ID=" {2F66466C-8030-49c6-BF7D-F86F4AE4049C} ">
    <Title>Gloom</Title>
    <Developer>Elbonia Software</Developer>
    <Publisher>MegaGreed Corp.</Publisher>
    <Genre>First Person Shooter</Genre>
    <FullVerison ID=" {09267324-C521-49ae-9F77-6466D036038D} ">
      <Cost>$35</Cost>
      <MinimumSystem>PII 200Hz</MinimumSystem>
      <HardDriveReq>100Mb</HardDriveReq>
    </FullVerison>
    <Demo ID=" {06C532A0-D54E-4bd1-9D11-3F74A7221FA9} ">
      <MinimumSystem>PII 200Hz</MinimumSystem>
      <HardDiskReq>45Mb</HardDiskReq>
    </Demo>
    <Review ID=" {7F25C8FD-EAB3-4576-AF9F-C94A551BBA79} ">
      <Reviewer>Bob</Reviewer>
      <Rating>76%</Rating>
    </Review>
  </Game>
  <Game ID=" {814043A1-4FBA-4bb0-AF7B-1F539F66CE45} ">
    <Title>Corporate Climber</Title>
    <Developer>Thinkers Software</Developer>
    <Publisher>CheapStuff Inc.</Publisher>
    <Genre>Strategy</Genre>
    <FullVerison ID=" {22494B70-0F69-4cfe-BB79-ECD22705A6FF} ">
      <Cost>$15</Cost>
      <MinimumSystem>PIII 400Hz</MinimumSystem>
      <HardDriveReq>100Mb</HardDriveReq>
    </FullVerison>
    <Demo ID=" {C2C007F3-18FE-4a39-A3DE-CFC09FE41EFA} ">
      <MinimumSystem>PIII 200Hz</MinimumSystem>
      <HardDiskReq>45Mb</HardDiskReq>
    </Demo>
    <Review ID=" {1F26CC11-F87D-4f3c-95C0-DB32C89E045D} ">
      <Reviewer>Sharon</Reviewer>
      <Rating>23%</Rating>
    </Review>
  </Game>
  <Game ID=" {4EF21124-F9FC-43a3-AD0A-BB2D0EE67D5C} ">
    <Title>Mule Kong</Title>
    <Developer>Hipdev</Developer>
    <Publisher>MegaGreed Corp.</Publisher>
    <Genre>Action</Genre>
    <FullVerison ID=" {A802ABC4-2F29-47fa-B788-9D42704AB334} ">
      <Cost>$38</Cost>
      <MinimumSystem>PII 200Hz</MinimumSystem>
      <HardDriveReq>30Mb</HardDriveReq>
    </FullVerison>
```

*FIG. 3A*

```xml
<Demo ID=" {649F9ECD-9994-4560-B84A-72B9AEEFC677} ">
    <MinimumSystem>PII 200Hz</MinimumSystem>
    <HardDiskReq>30Mb</HardDiskReq>
</Demo>
<Review ID=" {3BAA 1CF3-EE89-452a-9402-2CB77E077DB6} ">
    <Reviewer>Bob</Reviewer>
    <Rating>66%</Rating>
</Review>
</Game>
<Game ID=" {4EF21124-F9FC-43a3-AD0A-BB2D0EE67D5C} ">
    <Title>The Really Expensive Game</Title>
    <Developer>Lazy Development<Developer>
    <Publisher> MegaGreed Corp.</Publisher>
    <Genre>Action</Genre>
    <FullVerison ID=" {A802ABC2-2F29-47fa-B788-9D42704AB334} ">
        <Cost>$55</Cost>
        <MinimumSystem>PIII 500Hz<MinimumSystem>
        <HardDriveReq>33Mb</HardDriveReq>
    </FullVerison>
    <Demo ID=" {649F9ECE-9994-4560-B84A-72B9AEEFC677} ">
        <MinimumSystem>PIII 500Hz<MinimumSystem>
        <HardDiskReq>40Mb</HardDiskReq>
    </Demo>
    <Review ID=" {3BAA1 CF 1-EE89-452a-9402-2CB77E077DB6} ">
        <Reviewer>Alex</Reviewer>
        <Rating>98%</Rating>
    </Review>
</Game>
<Game ID=" {2CB78272-F0DB-4e40-BDC3-I27844D7DCB5} ">
    <Title>Real Football</Title>
    <Developer>Elbonia Software</Developer>
    <Publisher>MegaGreed Corp.</Publisher>
    <Genre>Sports</Genre>
    <FullVerison ID=" {D7E51912-EF30-4bc6-A824-FABD38CDA101} ">
        <Cost>$45</Cost>
        <MinimumSystern>PII 233Hz</MinimumSystern>
        <HardDriveReq>50Mb</HardDriveReq>
    </FullVerison>
    <Demo ID=" {3D908B51-8A3D-44e6-AD05-2D365D17A4CD} ">
        <MinimumSystem>PII 233Hz</MinimumSystem>
        <HardDiskReq>35Mb</HardDiskReq>
    </Demo>
    <Review ID=" {C7837F3F-B34B-4706-9D98-378934FD8F6C} ">
        <Reviewer>Sharon</Reviewer>
        <Rating>92%</Rating>
    </Review>
</Game>
</Packages>
```

SERIALIZED REPRESENTATION OF A SET OF
GAME PACKAGES WITH METADATA

*FIG. 3B*

| REVIEW | DEMO | PLAY |
|---|---|---|
| GLOOM<br>CORPORATE CLIMBER<br>REAL FOOTBALL<br>MULE KONG | REAL FOOTBALL<br>MULE KONG | GLOOM |

RESULTING FILTERED CONTENT

CHARACTERIZATION OF CONTENT BASED ON THE ASSOCIATED SERIALIZED DATA

BACKGROUND

Certain structured data may include associated information which describes the content of the associated data. This associated information is often called metadata. The associated information may be textual definitions defining the data contents.

Metadata is, in effect, data about data. The term refers to any data used to aid the identification, description and location of networked electronic resources. Many different metadata formats exist. This metadata has been used for various purposes.

BRIEF DESCRIPTION OF THE DRAWINGS

These and other aspects will now be described in detail with reference to the accompanying drawings, wherein:

FIG. 3 shows serialized data for a game package;

DETAILED DESCRIPTION

The present application teaches a system which includes elements of network content bound to descriptive information about the network content. Each element includes different parts. Each of the different parts include individual element metadata. The present application enables filtering elements of that network content based both on the metadata indicating the parts and of the package as a whole.

A package is assembled which includes both the content data and the metadata. The package both describes the content and also contains the content. The package of data may have structure within the package, as described.

Figure 1:
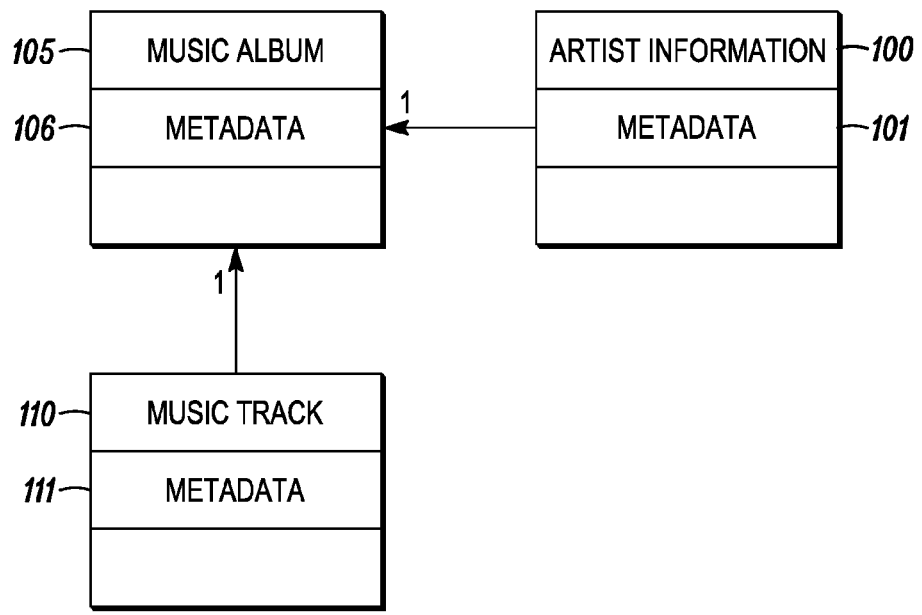
FIG. 1 shows a basic structure including entertainment data bound to content.

An embodiment shown in FIG. 1 may include a broadcast system that describes music structure such as MP3 files. For example, a set of files may be used to represent an album of MP3 music. This set of files may have the general structure shown in FIG. 1. The package as a whole is shown as element 105. This package represents the music album package. The package includes associated metadata 106 that represents the package as a whole. In addition, there are multiple structured parts to the package. Here, these multiple parts may include the artist information 100, and the music track itself 110. Each of these parts may themselves include associated metadata. For example, the artist information 100 includes artist information metadata 101. The music track 110 includes music track metadata 111.

In this embodiment, the metadata and the structure of the information containing packet is separated from the content itself. This may be used to form a structural metadata representation of the content of the package.

Figure 7:
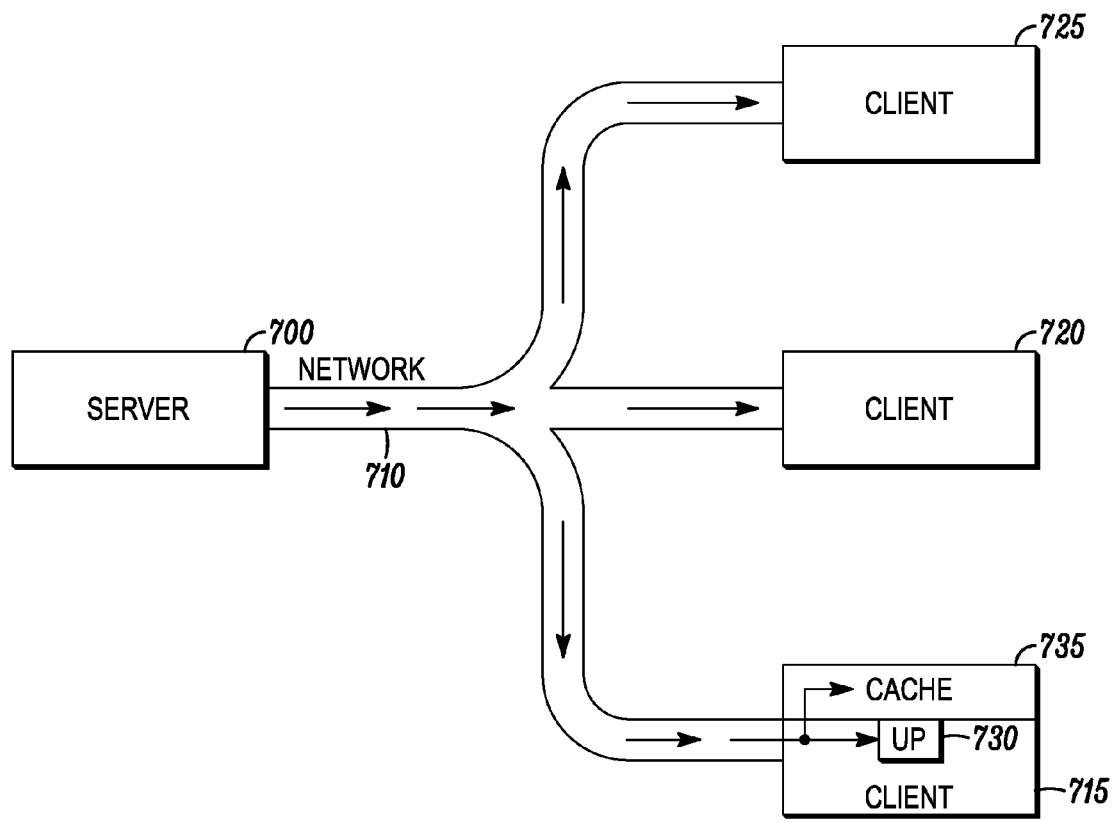
FIG. 7 shows a hardware block diagram.

FIG. 7 shows a block diagram of the system in which content from a server 700 is sent over the network 710 to a plurality of clients 715,720,725. While only three clients are shown in this embodiment, it should be understood that any number of clients can be added. There is effectively no limit on the number of clients that can be used in this system, since the information from the server 700 is sent in common to all clients, and the clients may accept any of this information without sending a response back to the server.

Figures 4, 5:
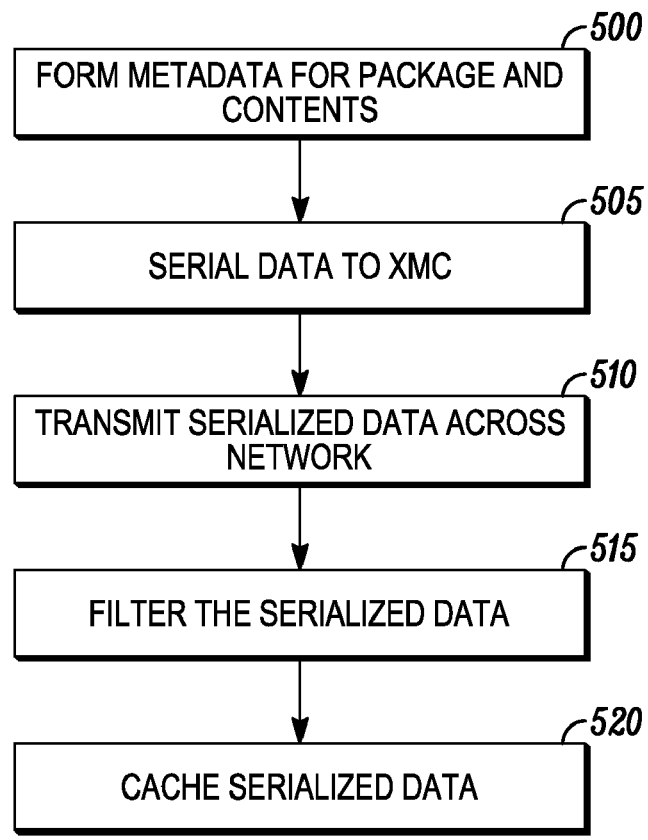
FIG. 4 shows resulting filtered content for game information.
FIG. 5 shows a flowchart of operation.

The operation may follow the flowchart of FIG. 5. At 505, the content of the metadata is serialized, e.g., to Xtensible Mark up Language ("XML"). The serialized data may be transmitted across the network at 510. The serialized data may be decoded and evaluated using conventional computer hardware and software.

In an embodiment, multiple packages of information are sent over the network. The content is filtered in order to automatically cache only specified content in which the user is interested. The structural representation of the metadata allows this filtering process to carry out special types of filtering as described herein.

As an example, the data structure in FIG. 1 may be sent over the network 710 with many other similar data structures. This may be used to produce a number of different items. Filtering rules may be defined at 515, to find and cache only specified content. Example filtering rules may include for example:

"Get me all the albums having a track called White Christmas".

"Get me the first three tracks of any album with an artist named 'Bing Crosby'"

"Get me the artist information only for albums that are referred to as being 'Pop' albums".

More generally, however, the rules may be any rules which can determine anything about either the package as a whole or the individual elements of the package.

The processor 730 in any of the clients may run the filters, and store content that meets the filtered rules in the cache memory 735.

In this embodiment, the content represents music being sent over a network. Other embodiments may send data, television and other audiovisual data, and other kinds of electronic programming over the network.

Figure 2:
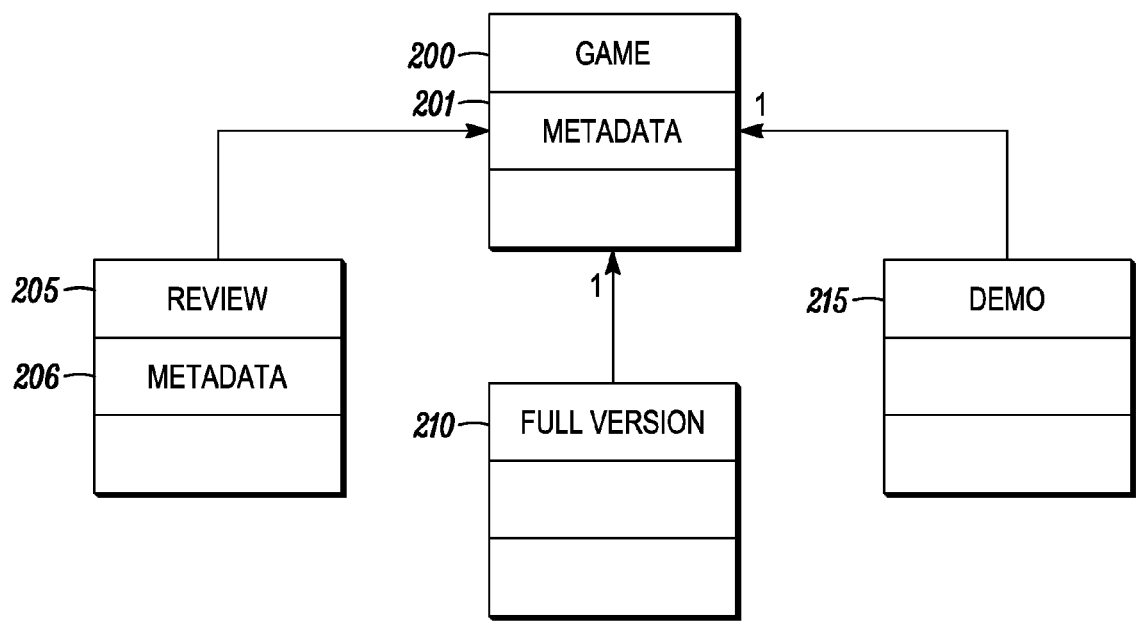
FIG. 2 shows a structural representation of data and content for a game package.

A second embodiment, shown in FIG. 2, may use the metadata representation to carry out a game distribution service, e.g. a Web service. The game distribution service may send reviews, demonstrations, and other information. This may allow a user, for example, to purchase a full game version. The games are sent in the form shown in FIG. 2.

A package is formed with metadata 201 describing the game itself 200. The subparts of the package also include different elements, and each may include metadata associated with those parts. For example, an element for review 205 may include associated metadata 206. Information about the full version 210 may be provided, as well as information about the demo version only 215. This system may be embodied as a Web service or some other service which is accessible over a network. A subscriber to the service can set up a rule filtering profile to capture all the reviews for games where the full version is under $40.

Another rule, for example, could set up a filtering profile to capture demos and reviews for action games that can run on a computer such as a processor from the Pentium II family of processors, available from Intel, of 233 Hz or less.

Another rule could be set up to look for games developed by "Elbonia Software" and to buy the latest version of the game "Gloom" if it costs under $30. This is an example, the rule can in fact be set up to look for other games or can be set to filter on any aspect at all.

FIG. 3 shows exemplary serialized structured metadata for the specific package. Note the different tags associated with the XML that effectively become definitions of the different characteristics. For example, metadata definitions of title, developer, publisher, genre, cost, minimum system, and other requirements can be provided. Identification numbers such as game ID and demo ID may be used to direct the user to more information about the game. The filter is applied to this serialized metadata. The filtered results may be in the form of the table of FIG. 4. For example, filtering based on positive reviews may be used to provide filtered results, like the ones shown in FIG. 4. This may be stored in the cache 735, enabling a user at the client 715 to review the information at any time.

This system may also be used to filter other network data information, including but not limited to, movie content, e-commerce content, and different types of package content.

Figure 6:
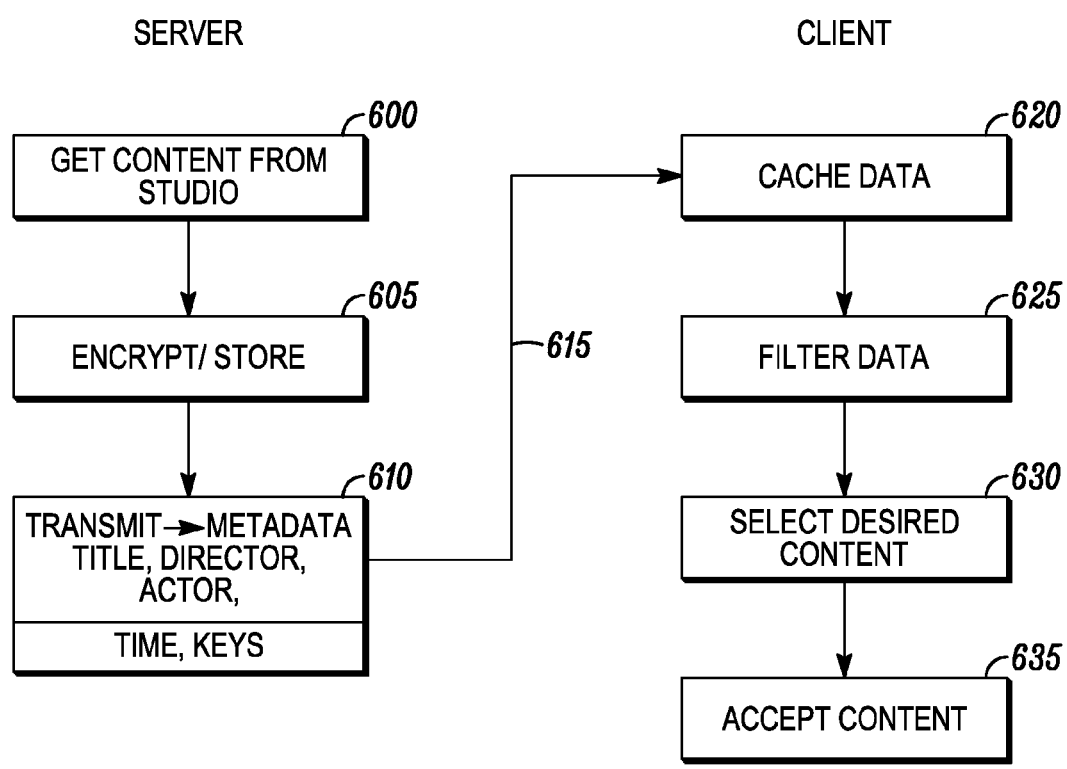
FIG. 6 shows a representation for broadcast data.

FIG. 6 shows an alternative embodiment in which this system is used to distribute movie distribution technology, e.g. streaming video. Many systems of this type, including so-called video on demand systems, require two-way communication. Typically, the user sends a request to the server, the server processes that request, and returns the data. However, during times of high usage, this system may become extremely bottlenecked. In the present system, complete one-way communication can be used to distribute the video. Binding between the content and the data avoids the need for a back channel of two-way communication. This, correspondingly, may reduce the video traffic.

This system may use one-way communication from the sever 700 to all the clients. This has the significant advantage that any number of clients can be attached to this system. The time when the movie will be sent is also transmitted as part of the package.

A flowchart of the operation is shown in FIG. 6. The left side of the flowchart represents the operations that occur in the "server". At 600, the actual content is obtained, e.g. from the studio that produces the information. This content may be encrypted and stored at 605 along with appropriate data about the content. That data may be formed as metadata of the type that is described according to the previous embodiments. The metadata is serialized and transmitted at 610. This metadata may include all available information about the content including, but not limited to, the title, director, actor, genre, and other information. Basically, all of the information about the data may be stored within the metadata that is bound to the data itself. The transmission may also include the time when the movie/broadcast data will be sent, as well as certain decrypting keys which are necessary to decrypt the movie. This may use any available encryption/decryption system, for example a system where combinations of multiple keys are used such that only authorized units can receive certain data.

The serialized information is transmitted as shown as 615 to the "client". There may be any number of such clients, all receiving all of the information. The clients carry out the flowchart by filtering and caching the data as shown previously in cache 735. The filtering may be according to user-specified criterion. The desired content is selected at 630, and accepted at 635. The acceptance at 635 may include decrypting the encrypted data at some future time.

Although only a few embodiments have been disclosed in detail above, other modifications are possible. All such modifications are intended to be encompassed within the following claims.

What is claimed is:

1. A computer implemented method, comprising:
   forming encrypted content to be disseminated over a network;
   forming data associated with said content, which data describes characteristics of said content and includes one or more decryption keys;
   serializing said associated data and providing said serialized associated data and said content as a package over the network from a server to one or more clients in a one-way communication, wherein said serialized associated data contains metadata and is bound to said content;
   filtering by said one or more clients said associated data according to a specified filtering criterion that is chosen by one or more users of said one or more clients;
   storing by said one or more clients filtered data and content; and
   decrypting by said one or more clients said filtered data and content using said one or more decryption keys.

2. A method as in claim 1, wherein said data is serialized into Xtensible Markup Language (XML) format.

3. A method as in claim 1, wherein said content includes music.

4. A method as in claim 1, wherein said content includes music, and said filtering criterion is a criterion of characteristics of the music.

5. A method as in claim 1, wherein said content includes games on a computer, and said filtering criterion filters based on data associated with the games.

6. A method as in claim 1, wherein said content includes entertainment forming content, indicative of content of video.

* * * * *